(12) United States Patent
Wang et al.

(10) Patent No.: US 8,721,271 B2
(45) Date of Patent: May 13, 2014

(54) OIL COOLER

(75) Inventors: Yi Wang, Nottingham (GB); Miles T Trumper, Loughborough (GB); Mark J Wilson, Nottingham (GB); Peter Ireland, Derby (GB); Robert C Chambers, Derby (GB)

(73) Assignee: Rolls-Royce PLC, London (GB)

( * ) Notice: Subject to any disclaimer, the term of this patent is extended or adjusted under 35 U.S.C. 154(b) by 690 days.

(21) Appl. No.: 12/956,501

(22) Filed: Nov. 30, 2010

(65) Prior Publication Data

US 2011/0135455 A1   Jun. 9, 2011

(30) Foreign Application Priority Data

Dec. 9, 2009   (GB) .................................. 0921484.2

(51) Int. Cl.
*F01D 5/08*   (2006.01)
(52) U.S. Cl.
USPC .......................................... 415/177; 415/178
(58) Field of Classification Search
CPC ......... F01D 25/08; F01D 25/12; F01D 25/14; F01D 25/18; F05D 2260/20
USPC ............. 415/144, 175–180; 416/116; 165/41, 165/51, 96, 98, 103, 159, 164, 165, 166
See application file for complete search history.

(56) References Cited

U.S. PATENT DOCUMENTS

| | | | |
|---|---|---|---|
| 7,703,506 B2 * | 4/2010 | Brost et al. .................... | 165/157 |
| 2006/0042225 A1 | 3/2006 | Bruno et al. | |
| 2007/0272400 A1 * | 11/2007 | Abul-Haj et al. ............. | 165/185 |
| 2008/0053059 A1 * | 3/2008 | Olver et al. .................. | 60/226.1 |
| 2008/0053060 A1 | 3/2008 | Olver | |
| 2010/0170667 A1 * | 7/2010 | Bertolotti et al. ............. | 165/166 |

OTHER PUBLICATIONS

British Search Report dated Mar. 11, 2010 issued in British Patent Application No. GB 0921484.2.

* cited by examiner

*Primary Examiner* — Dwayne J White
(74) *Attorney, Agent, or Firm* — Oliff PLC

(57) ABSTRACT

An air-cooled oil cooler for the wall of an air flow passage of a gas turbine engine is provided, the oil cooler allowing improved heat exchange performance to be obtained. This is achieved by: (I) diverting air flow from the inner side of the oil cooler towards the outer side of the oil cooler, (ii) enhancing heat exchange performance at the leading edge of the cooler, and/or (iii) suppressing airflow wake at the trailing edge of the cooler.

14 Claims, 4 Drawing Sheets

OIL COOLER

The present invention relates to an oil cooler for a wall of an air flow passage of a gas turbine engine.

Oil is used in gas turbine engines to lubricate and cool electrical generators, bearings and gears in the transmission system. This results in a large amount of heat being transferred to the oil. In order to maintain the oil, and the components that the oil is cooling, at acceptable temperatures, it is necessary to remove this heat. However, poor management of this heat removal can lead to significant losses in specific fuel consumption.

Both fuel/oil heat exchangers and air/oil heat exchangers are known. A conventional means of achieving oil cooling is via a surface-air cooled, oil cooler (SACOC) mounted on the inner surface of a fan bypass duct. A typical configuration of such a cooler is shown in FIG. 1. The cooler 102 is mounted at a wall 104 of the duct, and has a fin and plate construction with air fins both at inner 112 and outer 114 sides and with the oil passing twice through a central plate 110 in a cross-flow pattern. An airflow (arrows A) is conveyed along the fan bypass duct, and respective portions (arrows B and C) pass over the air fins to cool oil passing through the central plate 110. In such an arrangement, airflow B over the inner fins 112 tends to be greater than airflow C over the outer fins 114.

An object of the present invention is to provide an oil cooler for a wall of an air flow passage of a gas turbine engine, the oil cooler allowing improved heat exchange performance to be obtained.

In a first aspect of the invention, there is provided an oil cooler for a wall of an air flow passage of a gas turbine engine, the cooler including:

an oil flow section for carrying a flow of heated oil in a layer substantially parallel to the wall of the air flow passage, a plurality of inner air fins projecting away from the wall of the air flow passage from a side of the oil flow section, the inner air fins being spaced side-by-side and extending in the direction of air flow through the passage, and a plurality of outer air fins projecting towards the wall of the air flow passage from an opposing side of the oil flow section, the outer air fins being spaced side-by-side and extending in the direction of air flow through the passage;

wherein the inner air fins and the outer air fins are for transferring heat extracted from the heated oil into the air flowing through the passage, and wherein the cooler comprises one or more diverting surfaces which project forwardly into the incoming air to divert air flow through the passage away from the inner air fins and towards the outer air fins.

This arrangement promotes airflow to the outer side of the oil cooler, thus enhancing heat exchange by the outer fins at the outer side of the oil flow section. This allows greater overall levels of heat transfer to be achieved. Different arrangements of the, or each, diverting surface can control the amount of air flow to the outer side of the oil flow section.

The oil cooler of the first aspect may have any one or, to the extent that they are compatible, any combination of the following optional features.

A diverting surface may be formed by a lip which extends forward from the leading edge of the oil flow section.

Typically, the lip extends into the incoming air ahead of the leading edges of the inner air fins. The lip can thus face the incoming airflow and deflect airflow from the main air stream to the outer side of the oil flow section before it reaches the inner air fins. The lip may take any form provided that it fulfils its function of deflecting air flow to the outer air fins. For example, it may be curved or straight, or it may be in the form of a dog-leg to help minimise disturbance to airflow to the inner side of the oil flow section. The lip may be attached to the leading edge of the oil flow section in any conventional manner. For example, it may be welded, bolted or riveted to the oil flow section.

Alternatively, a forward portion of each inner air fin may extend into the incoming air ahead of the leading edge of the oil flow section, the lip extending forward from the leading edge of the oil flow section in the inter-fin passages formed between neighbouring forward portions of the inner air fins. Thus, the lip may be separated into a series of lip portions, each lip portion being bounded by adjacent fins. Positioning the lip portions in the inter-fin passages can help to strengthen the lip.

Alternatively or additionally, a diverting surface may be formed by the leading edges of the inner air fins, which leading edges project forwardly from the oil flow section into the incoming air. For example, the leading edges of the inner air fins may be profiled to project forwardly into the incoming air to deflect the air flow towards the outer side of the oil flow section. The leading edges of the front air fins may be straight or curved as appropriate to direct airflow towards the outer side of the oil flow section.

In a second aspect of the invention, there is provided an oil cooler for a wall of an air flow passage of a gas turbine engine, the cooler including:

an oil flow section for carrying a flow of heated oil in a layer substantially parallel to the wall of the air flow passage, a plurality of inner air fins projecting away from the wall of the air flow passage from a side of the oil flow section, the inner air fins being spaced side-by-side and extending in the direction of air flow through the passage, and a plurality of outer air fins projecting towards the wall of the air flow passage from an opposing side of the oil flow section, the outer air fins being spaced side-by-side and extending in the direction of air flow through the passage;

wherein the inner air fins and the outer air fins are for transferring heat extracted from the heated oil into the air flowing through the passage, and wherein the height of each inner air fin decreases over at least a portion of the distance from its leading edge to its trailing edge.

The oil cooler of the second aspect may have any one or, to the extent that they are compatible, any combination of the following optional features.

The height of the inner air fin can be greatest adjacent its leading edge. This is where the cooler tends to have the highest heat exchange rate, and an increased fin height at such a position can thus enhance heat exchange performance. The height of the inner air fin can be lowest adjacent its trailing edge. This helps to reduce air wake at the trailing edges of the inner air fins.

Thus preferably, the height of each inner air fin decreases over substantially all of the distance from its leading edge to its trailing edge. This can have a combined effect of enhancing heat exchange performance (as the height of the inner air fins will be greatest near their leading edges), as well as reducing air wake at the trailing edges of the inner air fins. The may have approximately the same heat exchange area as a conventional air-cooled oil cooler, but can have a higher heat dissipation capacity and reduced wake at the air outlet.

The above aspects may be combined, such that the oil cooler of the invention may include the features (and optionally the optional features) of either or both of the above aspects.

The oil cooler of the first and/or second aspects may also have any one or, to the extent that they are compatible, any combination of the following optional features.

The oil flow section typically extends as a lamellar body substantially parallel to the wall of the air flow passage, the heated oil flowing through an internal cavity or cavities formed in the body.

Typically, the oil flow section carries the flow of heated oil in a cross-flow direction relative to the direction of air flow through the passage.

The oil cooler may be for location at a wall of the bypass duct of a turbofan gas turbine engine.

A further aspect of the invention provides a gas turbine engine having an air flow passage comprising an oil cooler according to either or both of the previous aspects. For example, the gas turbine engine may be a turbofan gas turbine engine, the air flow passage being the bypass duct of the engine.

Also provided is a gas turbine engine including an oil cooler as described above, the engine having a nacelle, a core engine casing and an annular array of outlet guide vanes extending radially from the core engine casing to the nacelle, the wall is any one of a radially outer or an inner wall of the nacelle, core engine casing or a wall of at least one outlet guide vane.

Embodiments of the invention will now be described by way of example with reference to the accompanying drawings in which.

Figure 4:
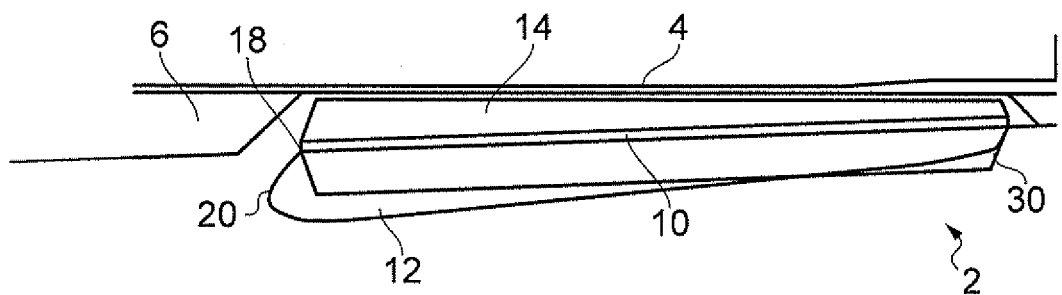
Figure 5:
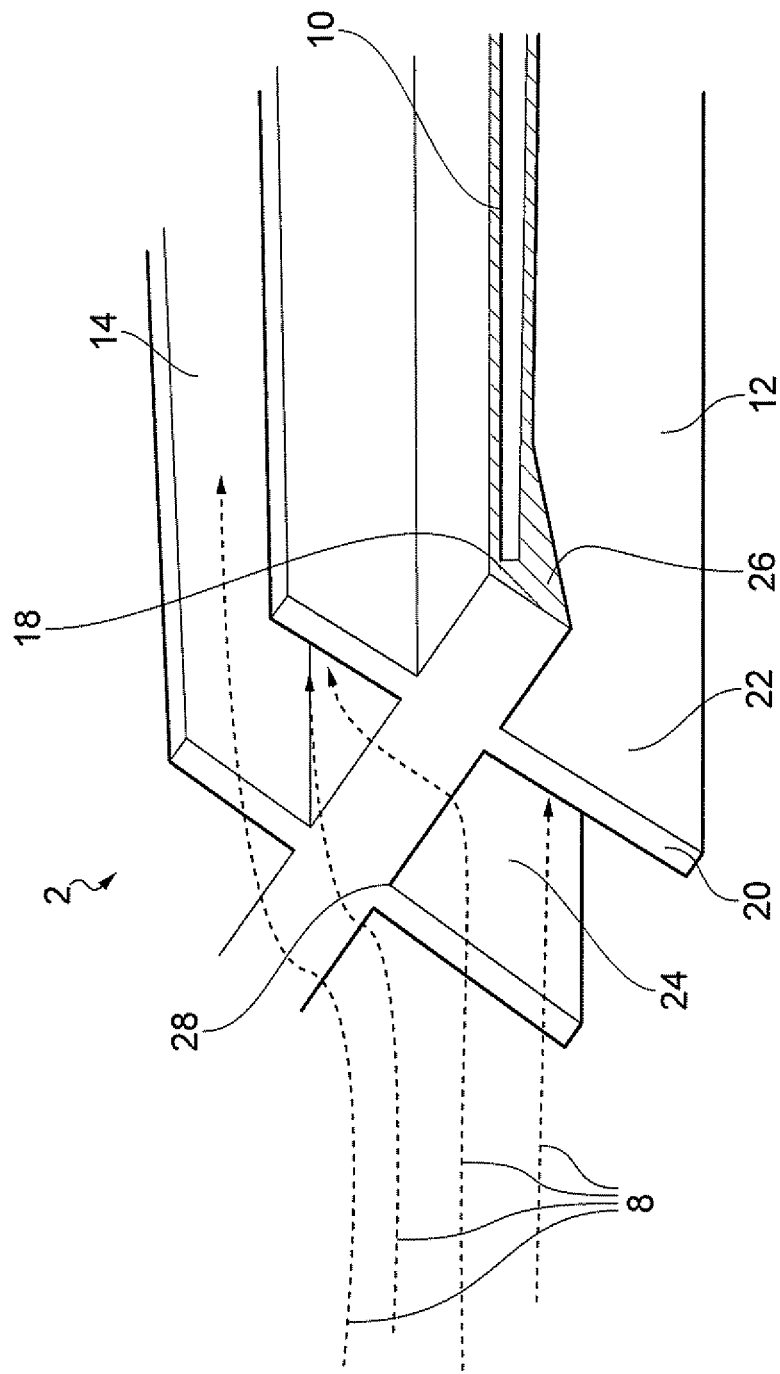
Figure 6:
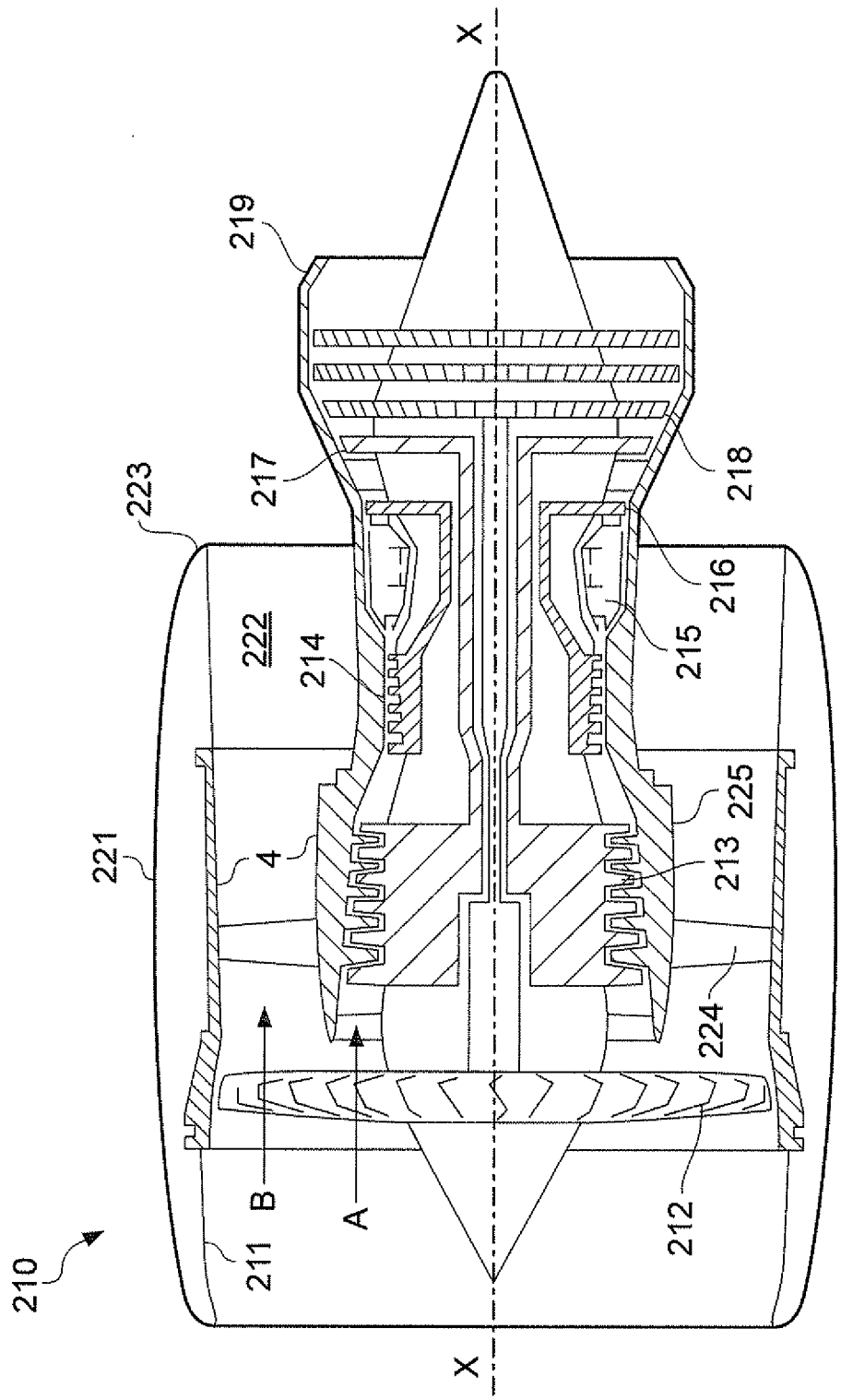

FIG. 4 shows a schematic side view of an oil cooler, which is another embodiment of the invention; and FIG. 5 shows a schematic view of the forward portion an oil cooler, which is another embodiment of the invention, the view showing in longitudinal cross-section the oil flow section and showing in perspective two adjacent inner fins and two adjacent outer fins; and FIG. 6 is a schematic section through a ducted fan gas turbine engine.

Various embodiments of the oil cooler of the invention are shown in FIGS. 2 to 5. In each of these embodiments, the oil cooler 2 is mounted on the wall 4 of a fan bypass duct. Forward and rearward of the oil cooler 2 are other structures 6 attached to the wall of the duct, such as acoustic panels and the like. The oil to be cooled passes twice through a lamellar, central, oil flow section 10 in a cross-flow pattern. An inner air fin 12 projects away from the wall 4 of the fan bypass duct from an inner surface of the oil flow section 10 and an outer air fin 14 projects towards the wall of the fan bypass duct from an opposing surface of the oil flow section 10. The inner air fin 12 and outer air fin 14 shown in FIGS. 2 to 5 represent just one of a plurality of spaced, side-by-side inner and outer air fins that are present in the cooler 2.

Figure 1:
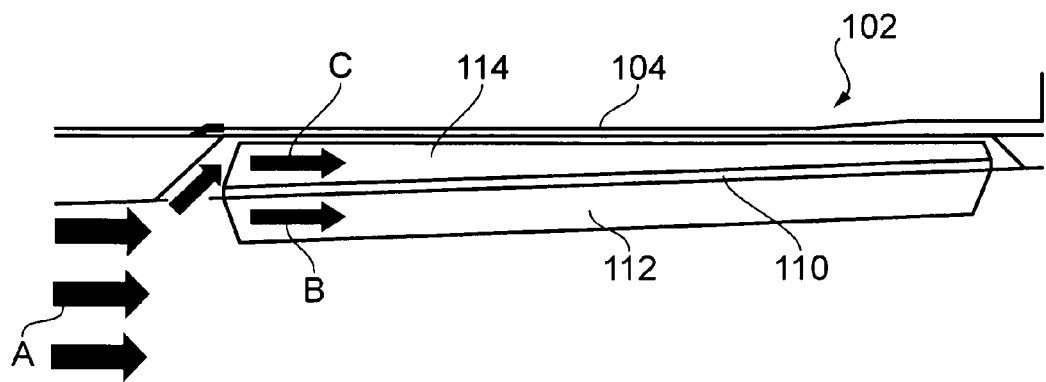
FIG. 1 shows a schematic side view of a conventional surface air-cooled oil cooler mounted on the inner surface of a fan bypass duct.
Figure 2:
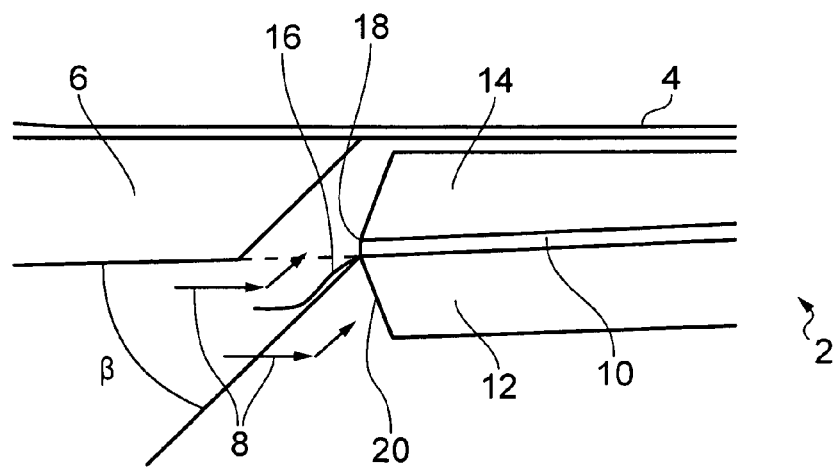
FIG. 2 shows a schematic side view of the leading edge of an oil cooler, which is an embodiment of the invention.

In the embodiment shown in FIG. 2, a dogleg-shaped lip 16 projects forwardly from the leading edge 18 of the oil flow section 10 into the incoming air 8 ahead of the leading edge 20 of the inner air fin 12 to divert air flow away from the inner air fins 12 and towards the outer air fins 14. This enhances airflow to the outer side of the cooler 2 and thus increases the effectiveness of the outer air fins 14, which are otherwise sheltered from the incoming air flow by upstream structure 6. The design of the lip 16 enables the amount of airflow diversion to the outer side of the oil flow section 10 to be controlled by specifying the level of protrusion (i.e. the forward angle, 13) of the lip 16 into the incoming air 8. In this embodiment, the dogleg shape of the lip 16 helps to minimise disturbance to airflow to the inner side of the oil flow section 10.

Figure 3:
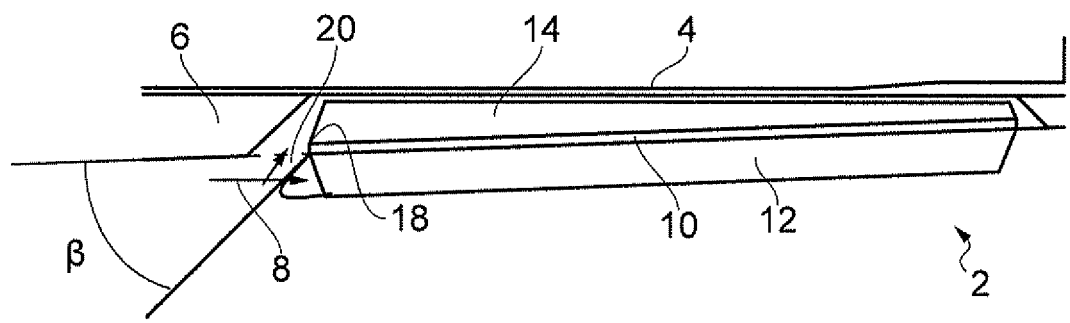
FIG. 3 shows a schematic side view of an oil cooler, which is another embodiment of the invention.

In the embodiment shown in FIG. 3, the leading edges 20 of the inner air fins 12 project forwardly from the oil flow section 10 into the incoming air 8 to form a diverting surface which diverts air flow away from the inner air fins 12 towards the outer air fins 14. Results of a computational fluid dynamics (CFD) study indicate there is a local static pressure rise at the leading edges 20 of the inner air fins 12. In this embodiment, the profile of the leading edges 20 moves the pressure rise location forward, thereby improving airflow to the outer side of the oil flow section 10. The cross-sectional area of the inner fins 12 is approximately 20% of the total cross-sectional area of the inner fins and the gaps between the inner fins. Thus a similar percentage increase in flow towards the outer side of the cooler can be expected by adopting forwardly projecting leading edges 20 for the inner air fins 12.

For enhanced flow diversion towards the outer side of the cooler 2, the lip 16 of the embodiment of FIG. 2 could be combined with the forwardly projecting leading edges 20 of the inner air fins 12 of the embodiment of FIG. 3.

In the embodiment shown in FIG. 4, the leading edges 20 of the inner air fins 12 are profiled to divert airflow towards the outer air fins 14. Further, the height of the inner air fins 12 decreases over substantially all of the distance from their leading edges 20 to their trailing edges 30. Therefore, the height of the inner air fins 12 is greatest near their leading edges 20, which is where the cooler 2 has the highest heat exchange rate. This helps to enhance heat exchange performance. In addition, the smoothly decreasing height of the inner air fins 12 towards their trailing edges 30 helps to minimise airflow wake behind the cooler 2.

The embodiment shown in FIG. 5 is an alternative to that shown in FIG. 3. The leading edges 20 of the inner air fins 12 still project forwardly from the oil flow section 10 into the incoming air 8 to form a diverting surface which diverts air flow away from the inner air fins 12 towards the outer air fins 14. However, in the gap 24 between forward portions 22 of each pair of neighbouring inner air fins, a triangular prismatic filling piece 26 projects from the leading edge 18 of the oil flow section 10 to partially block off the gap 24 to incoming air and divert incoming air to the outer side of the oil flow section 10. Thus the filling pieces 26 in combination form a flow diverting lip to direct the airflow away from the inner air fins 12 and towards the outer air fins 14, the diverting lip supplementing the diverting surface formed by the leading edges of the inner air fins. Relative to the lip 16 of the embodiment of FIG. 2, the filling pieces 26 are less exposed to the incoming air and are supported at their sides by the forward portions 22 of the inner air fins 12. Thus the embodiment of FIG. 5 may be more robust than that of FIG. 2.

Typically, the inner 12 and outer 14 air fins are formed by machining out the gaps 24 between neighbouring fins. The filling pieces 26 can thus be formed by leaving unmachined material in the gaps between fins. The transition from each forward portion 22 to the neighbouring filling piece 26 can be made smooth, rather left as an abrupt corner 28 as shown in FIG. 5.

With reference to FIG. 6, a ducted fan gas turbine engine generally indicated at 210 has a principal and rotational axis X-X. The engine comprises, in axial flow series, an air intake 211, a propulsive fan 212, an intermediate pressure compressor 213, a high-pressure compressor 214, combustion equipment 215, a high-pressure turbine 216, and intermediate pressure turbine 217, a low-pressure turbine 218 and a core engine exhaust nozzle 219. A nacelle 221 generally surrounds the engine 210 and defines the intake 211, a bypass duct 222 and a bypass exhaust nozzle 223. The bypass duct is defined radially inwardly by a core engine casing 225.

The gas turbine engine 210 works in a conventional manner so that air entering the intake 211 is accelerated by the fan 212 to produce two air flows: a first air flow A into the intermediate pressure compressor 214 and a second air flow B which passes through the bypass duct 222 to provide propulsive thrust. The intermediate pressure compressor 213 compresses the air flow A directed into it before delivering that air to the high pressure compressor 214 where further compression takes place.

The compressed air exhausted from the high-pressure compressor 214 is directed into the combustion equipment 215 where it is mixed with fuel and the mixture combusted. The resultant hot combustion products then expand through, and thereby drive the high, intermediate and low-pressure turbines 216, 217, 218 before being exhausted through the nozzle 219 to provide additional propulsive thrust. The high, intermediate and low-pressure turbines respectively drive the high and intermediate pressure compressors 214, 213 and the fan 212 by suitable interconnecting shafts.

The oil cooler described herein is intended to be mounted to or housed within the wall 4 shown in the gas turbine engine in FIG. 6. The wall 4 is shown as any one of the radially inner or outer wall of the bypass duct 222. The wall may also be radially an outer wall of the nacelle 221 or even a wall of an aerofoil such as one or more of an outlet guide vanes 224 of an annular array of radially extending outlet guide vanes.

While the oil cooler has been described in conjunction with the exemplary embodiments described above, many equivalent modifications and variations will be apparent to those skilled in the art when given this disclosure. Accordingly, the exemplary embodiments of the oil cooler set forth above are considered to be illustrative and not limiting. Various changes to the described embodiments may be made without departing from the spirit and scope of the claims.

The invention claimed is:

1. An oil cooler for a wall of an air flow passage of a gas turbine engine, the cooler including:
   an oil flow section for carrying a flow of heated oil in a layer substantially parallel to the wall of the air flow passage,
   a plurality of inner air fins projecting away from the wall of the air flow passage from a side of the oil flow section, the inner air fins being spaced side-by-side and extending in the direction of air flow through the passage, and
   a plurality of outer air fins projecting towards the wall of the air flow passage from an opposing side of the oil flow section, the outer air fins being spaced side-by-side and extending in the direction of air flow through the passage;
   the inner air fins and the outer air fins are for transferring heat extracted from the heated oil into the air flowing through the passage, and
   the oil cooler comprises one or more diverting surfaces which project forwardly into the incoming air to divert air flow through the passage away from the inner air fins and towards the outer air fins.

2. An oil cooler according to claim 1, wherein a diverting surface is formed by a lip which extends forward from the leading edge of the oil flow section.

3. An oil cooler according to claim 2, wherein the lip extends into the incoming air ahead of the leading edges of the inner air fins.

4. An oil cooler according to claim 2, wherein a forward portion of each inner air fin extends into the incoming air ahead of the leading edge of the oil flow section, the lip extending forward from the leading edge of the oil flow section in the inter-fin passages formed between neighboring forward portions of the inner air fins.

5. An oil cooler according to claim 1, wherein a diverting surface is formed by the leading edges of the inner air fins, which leading edges project forwardly from the oil flow section into the incoming air.

6. An oil cooler according to claim 1, wherein the height of each inner air fin decreases over at least a portion of the distance from its leading edge to its trailing edge.

7. An oil cooler according to claim 1 for location at a wall of the bypass duct of a turbofan gas turbine engine.

8. A gas turbine engine having an air flow passage comprising an oil cooler according to claim 1.

9. A gas turbine engine including an oil cooler according to claim 1, the engine including
   a nacelle,
   a core engine casing and
   an annular array of outlet guide vanes extending radially from the core engine casing to the nacelle,
   the wall is any one of a radially outer or a radially inner wall of the nacelle, core engine casing or a wall of at least one outlet guide vane.

10. An oil cooler for a wall of an air flow passage of a gas turbine engine, the cooler including:
    an oil flow section for carrying a flow of heated oil in a layer substantially parallel to the wall of the air flow passage,
    a plurality of inner air fins projecting away from the wall of the air flow passage from a side of the oil flow section, the inner air fins being spaced side-by-side and extending in the direction of air flow through the passage, and
    a plurality of outer air fins projecting towards the wall of the air flow passage from an opposing side of the oil flow section, the outer air fins being spaced side-by-side and extending in the direction of air flow through the passage;
    the inner air fins and the outer air fins are for transferring heat extracted from the heated oil into the air flowing through the passage, and
    the height of each inner air fin decreases over at least a portion of the distance from its leading edge to its trailing edge.

11. An oil cooler according to claim 10, wherein the height of each inner air fin decreases over substantially all of the distance from its leading edge to its trailing edge.

12. An oil cooler according to claim 10 for location at a wall of the bypass duct of a turbofan gas turbine engine.

13. A gas turbine engine having an air flow passage comprising an oil cooler according to claim 10.

14. A gas turbine engine including an oil cooler according to claim 10, the engine including
    a nacelle,
    a core engine casing and
    an annular array of outlet guide vanes extending radially from the core engine casing to the nacelle,
    the wall is any one of a radially outer or an inner wall of the nacelle, core engine casing or a wall of at least one outlet guide vane.

* * * * *